(12) United States Patent
Mizukami et al.

(10) Patent No.: US 11,820,164 B2
(45) Date of Patent: Nov. 21, 2023

(54) RESIN-IMPREGNATED DECORATIVE PAPER AND RESIN-IMPREGNATED DECORATIVE PLATE

(71) Applicant: TOPPAN INC., Tokyo (JP)

(72) Inventors: Ryohei Mizukami, Tokyo (JP); Chiho Harada, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/922,570

(22) PCT Filed: Apr. 5, 2021

(86) PCT No.: PCT/JP2021/014547
§ 371 (c)(1),
(2) Date: Oct. 31, 2022

(87) PCT Pub. No.: WO2021/235122
PCT Pub. Date: Nov. 25, 2021

(65) Prior Publication Data
US 2023/0143186 A1    May 11, 2023

(30) Foreign Application Priority Data

May 22, 2020  (JP) ................................ 2020-090089

(51) Int. Cl.
*B41M 5/50* (2006.01)
*B41M 7/00* (2006.01)

(52) U.S. Cl.
CPC .............. *B41M 5/50* (2013.01); *B41M 5/508* (2013.01); *B41M 7/0036* (2013.01)

(58) Field of Classification Search
CPC ....... B41M 5/50; B41M 5/508; B41M 7/0036

USPC ....................................................... 428/32.18
See application file for complete search history.

(56) References Cited

U.S. PATENT DOCUMENTS

| 2012/0070595 | A1* | 3/2012 | Sloat .......................... G09F 3/04 156/160 |
| 2021/0198845 | A1 | 7/2021 | Harima et al. |
| 2023/0143186 | A1* | 5/2023 | Mizukami ............ B41M 7/0036 428/201 |

FOREIGN PATENT DOCUMENTS

| EP | 3206886 B1 | 11/2020 |
| JP | S57-191082 A | 11/1982 |
| JP | H01-299676 A | 12/1989 |
| JP | H09-262956 A | 10/1997 |

(Continued)

OTHER PUBLICATIONS

International Search Report dated Jul. 6, 2021, for International Application No. PCT/JP2021/014547, with translation, 5 pages.

(Continued)

*Primary Examiner* — Betelhem Shewareged
(74) *Attorney, Agent, or Firm* — Squire Patton Boggs (US) LLP

(57) ABSTRACT

There is provided a resin-impregnated decorative paper (2) formed by impregnating a decorative paper (4) with an impregnating resin (5). The decorative paper (4) includes: a base paper (6); a picture pattern layer (7) provided on a surface (6a) side of the base paper (6); a filling layer (8) provided on a surface (7a) of the picture pattern layer (7); and a foamed resin layer (9) provided on a surface (8a) of the filling layer (8). The filling layer (8) contains at least one of an epoxy-based resin, an acrylic-based resin, a urethane-based resin, and a casein-based resin.

12 Claims, 1 Drawing Sheet

(56) References Cited

FOREIGN PATENT DOCUMENTS

| | | |
|---|---|---|
| JP | H11-91060 A | 4/1999 |
| JP | H11-138735 A | 5/1999 |
| JP | 2019-206109 A | 12/2019 |

OTHER PUBLICATIONS

Third Party Observation dated Apr. 5, 2021, for International Application No. PCT/JP2021/014547, 2 pages.
International Preliminary Report on Patentability dated Dec. 1, 222 for International Application No. PCT/JP2021/014547, 6 pages.

\* cited by examiner

RESIN-IMPREGNATED DECORATIVE PAPER AND RESIN-IMPREGNATED DECORATIVE PLATE

CROSS-REFERENCE

This application is a National Stage filing under 35 U.S.C. § 371 of International Patent Application No. PCT/JP2021/014547, filed Apr. 5, 2021, which claims the benefit of and priority to Japanese Patent Application No. 2020-090089, filed May 22, 2020, the contents of all of which are hereby incorporated by reference in their entireties for all purposes.

TECHNICAL FIELD

The present invention relates to a resin-impregnated decorative paper and a resin-impregnated decorative plate.

BACKGROUND ART

Conventionally, a method for manufacturing a resin-impregnated decorative plate has been proposed that causes a metal plate to abut on a multi-layer composite of a resin-impregnated decorative paper impregnated with a thermosetting resin and a base member and performs heat pressure molding, thereby obtaining a resin-impregnated decorative plate in which the resin-impregnated decorative paper and the base member are integrated together (e.g., see PTL 1). In the manufacturing method of the resin-impregnated decorative plate described in PTL 1, an embossed shape is formed on a metal plate to give uneven patterns to a surface of the resin-impregnated decorative plate, thereby giving a touch feeling. Further, by adjusting the degree of coarseness and fineness of the embossed shape, it is also possible to give a gloss matte expression.

However, in the manufacturing method of the resin-impregnated decorative plate described in PTL 1, it is necessary to prepare the metal plate for each uneven pattern to be given, and therefore there is a possibility that the cost increases. Accordingly, it is conceivable to give uneven patterns by providing foamed resin layers. However, since a foamed resin having affinity with an impregnating resin such as a melamine resin easily soaks into a base paper, there is a possibility that a touch feeling or a gloss matte feeling decreases.

CITATION LIST

Patent Literature

PTL 1: JP H09-262956 A

SUMMARY OF INVENTION

Technical Problem

The present invention has been made focusing on the problems described above and has an object to provide a resin-impregnated decorative paper and a resin-impregnated decorative plate that are excellent in gloss matte expression and touch feeling while suppressing the cost.

Solution to Problem

A resin-impregnated decorative paper according to one aspect of the present invention is a resin-impregnated decorative paper formed by impregnating a decorative paper with an impregnating resin, the decorative paper including: a base paper; a picture pattern layer provided on a surface side of the base paper; a filling layer provided on a surface of the picture pattern layer; and a foamed resin layer provided on a surface of the filling layer, the foamed resin layer formed by a foaming agent, wherein the filling layer contains at least one of an epoxy-based resin, an acrylic-based resin, a urethane-based resin, and a casein-based resin.

A resin-impregnated decorative plate according to another aspect of the present invention includes: the resin-impregnated decorative paper; and a base member integrated with the resin-impregnated decorative paper.

Advantageous Effects of Invention

According to the present invention, it is possible to foam a foaming agent by heat pressure molding to properly form an uneven pattern on a surface of a resin-impregnated decorative paper. Since it is not necessary to prepare a metal plate for each uneven pattern, it is possible to provide a resin-impregnated decorative paper and a resin-impregnated decorative plate that are excellent in gloss matte expression and touch feeling while suppressing the cost. Further, since a filling layer containing at least one of an epoxy-based resin, an acrylic-based resin, a urethane-based resin, and a casein-based resin is provided, it is possible to restrain a foamed resin forming a foamed resin layer from soaking into a picture pattern layer or a base paper. Therefore, it is possible to provide a resin-impregnated decorative paper and a resin-impregnated decorative plate that are further excellent in gloss matte expression and touch feeling.

DESCRIPTION OF EMBODIMENTS

Hereinafter, a decorative paper, a resin-impregnated decorative paper, and a resin-impregnated decorative plate according to an embodiment of the present invention will be described with reference to the drawings. The present invention is not limited to the embodiment described below and can also be added with a modification such as a change in design based on knowledge of those skilled in the art. An embodiment added with such a modification is also included in the scope of the present invention. Each of the drawings is illustrated in an exaggerated manner as appropriate to facilitate the understanding.

(Configuration)

Figure 1:
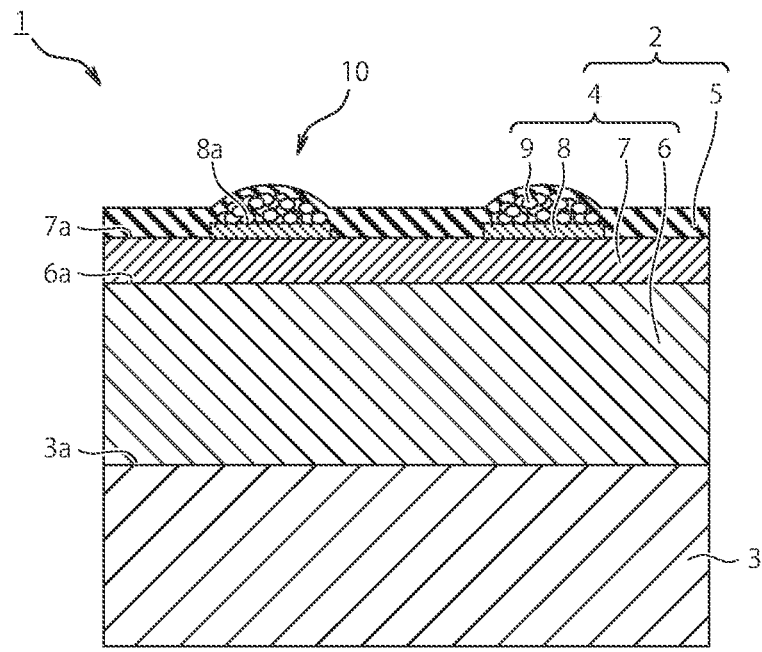
FIG. 1 is a sectional view illustrating a resin-impregnated decorative plate after heat pressure molding.
Figure 2:
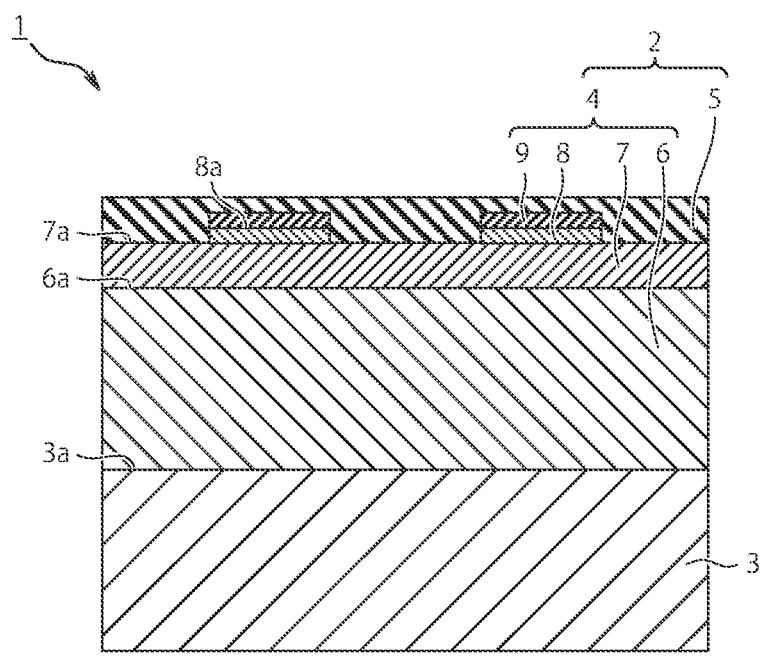
FIG. 2 is a sectional view illustrating a resin-impregnated decorative plate before heat pressure molding.

As illustrated in FIGS. 1 and 2, a resin-impregnated decorative plate 1 according to an embodiment of the present invention is a decorative plate obtained by applying heat pressure molding to a multi-layer composite of a resin-impregnated decorative paper 2 and a base member 3 to integrate the resin-impregnated decorative paper 2 and the base member 3 with each other. Specifically, the resin-impregnated decorative plate 1 includes the base member 3 and the resin-impregnated decorative paper 2 provided on the surface 3a side of the base member 3. The resin-impregnated decorative plate 1 according to the embodiment of the present invention is a resin-impregnated decorative plate used for, for example, interior decoration of floor surfaces, wall surfaces, ceilings, and the like of buildings, surface decoration materials of furniture, various cabinets, and the like, surface decoration of furnishings, vehicle interior decoration, and the like. FIG. 1 illustrates the resin-impregnated decorative plate 1 after the heat pressure molding, and FIG. 2 illustrates the resin-impregnated decorative plate 1 before the heat pressure molding.

(Base Member)

The kind of the base member 3 is not particularly limited. It is possible to use an arbitrary base member according to a use of the resin-impregnated decorative plate 1 to be targeted. For example, a woody base member such as a wood veneer, a plywood, a laminated wood, a particle board, a medium density fiberboard, or a hard fiberboard, a fibrous base member such as a paper board, a woven fabric, a nonwoven fabric, a resin-impregnated paper, or a resin-impregnated fabric, an inorganic base member such as a gypsum board, a slate board, a calcium silicate board, a slag gypsum board, a wood wool cement board, a slag cement board, an autoclaved lightweight concrete board, or a glass fiber-reinforced concrete board, a metal base member such as a steel plate, a brass plate, an aluminum plate, a duralumin plate, or a stainless steel plate, a synthetic resin base member such as an acrylic resin plate, a styrene resin plate, an ABS (Acrylonitrile butadiene styrene) resin plate, a polycarbonate resin plate, a nylon resin plate, a polystyrene resin plate, a polypropylene resin plate, a polyester resin plate, or a glass fiber-reinforced plastic plate, or the like, or a composite or a multi-layer composite of two or more kinds selected from these base members or the like can be adopted.

(Resin-Impregnated Decorative Paper)

The resin-impregnated decorative paper 2 according to the embodiment of the present invention is formed by impregnating the entire decorative paper 4 with an impregnating resin 5 and then drying the decorative paper 4. The decorative paper 4 includes a base paper 6, a picture pattern layer 7, filling layers 8, and foamed resin layers 9. The picture pattern layer 7 is provided on a surface 6a of the base paper 6. The filling layers 8 are provided on a surface 7a of the picture pattern layer 7. The foamed resin layers 9 are provided on surfaces 8a of the filling layers 8.

(Base Paper)

As the base paper 6, it is possible to use a fibrous sheet-like object, such as paper with high water absorbency, that allows impregnation of the impregnating resin 5. For example, a thin paper, a titanium paper, a high-quality paper, a bleached or unbleached kraft paper, or the like can be adopted. In particular, considering both the suitability for printing and the suitability for resin impregnation, the titanium paper is the most suitable. When taking advantage of the texture of the surface 3a of the base member 3, it is preferable to use a so-called transparent paper having a property of becoming transparent by the impregnation of the impregnating resin 5. The thickness of the base paper 6 is not particularly limited, but the basis weight is preferably in a range of 20 g/m$^2$ or more and 200 g/m$^2$ or less.

(Picture Pattern Layer)

The picture pattern layer 7 is a layer for giving a design property by a picture pattern to the resin-impregnated decorative paper 2. The picture pattern layer 7 is formed by using a printing ink or the like in which a coloring agent such as a dye or a pigment is dissolved or dispersed in a diluent solvent along with an appropriate binder resin. The kind of the printing ink is not particularly limited and may be an oil-based ink or a water-based ink. Specifically, as the printing ink, it is possible to use a usual printing ink having no liquid repellency.

In particular, considering the suitability for the impregnation of the impregnating resin 5, the water-based ink is the most suitable. The water-based ink has good affinity with an aqueous solution of an impregnating resin as compared to the oil-based ink. Therefore, when the water-based ink is used, the decorative paper 4 can be quickly and uniformly impregnated with the impregnating resin 5 in an impregnation process in the manufacture of the resin-impregnated decorative plate 1, and further, the strength can be exhibited in the excellent picture pattern layer 7 by integration with the impregnating resin 5. The kind of the water-based ink is not particularly limited, but it is preferable that the water-based ink contain a binder resin mainly composed of casein and an emulsion resin.

Such a binder resin has a property of becoming water-insoluble through a drying process after printing of ink. Therefore, when a binder resin containing such a binder resin is used, the picture pattern layer 7 is difficult to redissolve in an aqueous solution of the impregnating resin 5 in a resin impregnation process in the manufacture of the resin-impregnated decorative plate 1, so that it is possible to hold the picture pattern and further it is possible to prevent contamination of the impregnating resin 5.

As the emulsion resin, it is possible to adopt, for example, an acrylic-based emulsion resin, a vinyl acetate-based emulsion resin, a styrene-based emulsion resin, a urethane-based emulsion resin, or the like. In the binder resin, for example, a water-soluble resin such as polyvinyl alcohol or polyacrylamide, a water-soluble polymer such as polysaccharide or cellulose derivative, or the like may be used in addition to the casein and the emulsion resin to improve the stability of ink.

A method for forming the picture pattern layer 7 is not particularly limited. It is possible to use an arbitrary printing method such as, for example, a gravure printing method, an offset printing method, a screen printing method, a flexographic printing method, a relief printing method, or an ink jet printing method. Between layers of the picture pattern layer 7 and the base paper 6, a solid ink layer intended for base coloring may be provided. When the solid ink layer is provided, an arbitrary coating method such as a roll coating method, a gravure coating method, a rod coating method, a knife coating method, an air knife coating method, a spray coating method, a lip coating method, or a die coating method, for example, can also be used as a method for forming the solid ink layer other than various printing methods described above.

The kind of a picture formed by the picture pattern layer 7 is not particularly limited. It is possible to use an arbitrary picture according to a use of the resin-impregnated decorative plate 1 to be targeted. For example, a wood grain pattern, a stone grain pattern, a fabric grain pattern, an abstract pattern, a geometric figure, a character, a sign, a monochromatic plain pattern, or the like or a combination of two or more kinds selected from these patterns or the like can be adopted.

(Filling Layer)

The filling layers 8 are coating layers partially formed on the picture pattern layer 7 for preventing penetration of a foamed resin into the base paper 6. As a resin forming the filling layers 8, it is possible to use, for example, a curable resin such as a thermosetting resin having a urethane bond, such as a two-component curable urethane resin, or an ionizing radiation curable resin. As the curable resin, it is possible to use, for example, a thermosetting resin such as an epoxy-based resin, an acrylic-based resin, a urethane-based resin, a casein-based resin, a melamine-based resin, a urea-based resin, a phenol-based resin, an unsaturated polyester-based resin, a diallyl phthalate-based resin, a benzoguanamine-based resin, an aminoalkyd-based resin, or a silicone-based resin, an ionizing radiation curable resin such as a (meth)acrylate-based resin or an unsaturated polyester-based resin, or the like.

A method for printing the filling layers 8 is not particularly limited like the picture pattern layer 7. It is possible to use an arbitrary printing method such as, for example, a gravure printing method, an offset printing method, a screen printing method, a flexographic printing method, a relief printing method, or an ink jet printing method.

As the forming positions of the filling layers 8, those aligned in terms of design with a pattern (picture pattern) formed by the picture pattern layer 7 can be used. For example, the filling layers 8 are formed at portions where a matte or glossy texture is to be expressed in the pattern (picture pattern) formed by the picture pattern layer 7. This makes it possible to further improve the design property of the resin-impregnated decorative plate 1. The resin for forming the filling layers 8 may be colorless or colored.

The film thickness of the filling layer 8 is satisfactorily 0.5 $\mu$m or more and 15 $\mu$m or less and, in particular, more preferably 1 $\mu$m or more and 10 $\mu$m or less. When the film thickness is less than 0.5 $\mu$m, the foamed resin (thermoplastic resin) may soak into the base paper 6. When the film thickness is greater than 15 $\mu$m, the design property decreases.

It is satisfactory for the filling layer 8 to be provided in a range of 100% or more of the surface area (coating area) of the foamed resin layer 9 and, in particular, it is more preferable for the filling layer 8 to be provided in a range of 150% or less of the surface area of the foamed resin layer 9. When less than 100% of the surface area of the foamed resin layer 9, the foamed resin forming the foamed resin layer 9 may soak into the picture pattern layer or the base paper. When greater than 150% of the surface area of the foamed resin layer 9, the design property decreases. In the case where the arrangement position of the foamed resin layer 9 is aligned with a picture formed by the picture pattern layer 7, it can be rephrased as follows. It is satisfactory for the filling layer 8 to be provided in a range of 100% or more of the area of the picture formed by the picture pattern layer 7, and it is more preferable for the filling layer 8 to be provided in a range of 150% or less of the area of the picture formed by the picture pattern layer 7.

(Foamed Resin Layer)

The foamed resin layers 9 are layers for giving a gloss matte expression and a touch feeling by uneven patterns 10 on a surface of the resin-impregnated decorative paper 2. The kind of a foaming agent is not particularly limited, and an arbitrary foaming agent can be used. For example, it is possible to adopt a pyrolytic chemical foaming agent such as an azo-based foaming agent such as azodicarbonamide or azobisformamide, or a hydrazide-based foaming agent such as oxybenzenesulfonyl hydrazide or paratoluenesulfonyl hydrazide, a microcapsule foaming agent, or the like.

In particular, the microcapsule foaming agent is the most suitable. The microcapsule foaming agent has a capsule and a volatile substance enclosed in the capsule. The microcapsule foaming agent enters a foamed state when the volatile substance is volatilized to expand the capsule. As a material of the capsule, it is possible to use, for example, a vinylidene chloride-acrylonitrile copolymer or the like. As a material of the volatile substance, it is possible to use, for example, aliphatic hydrocarbon or the like.

As the foaming agent, it is preferable that the average particle diameter before foaming be $\frac{2}{3}$ times or more and 50 times or less the layer thickness of the picture pattern layer 7. When the average particle diameter is less than $\frac{2}{3}$ times the layer thickness of the picture pattern layer 7, there is a possibility that the gloss matte feeling and the touch feeling may become poor. On the other hand, when the average particle diameter is greater than 50 times the layer thickness of the picture pattern layer 7, there is a possibility that the foamed resin layers 9 after foaming may drop off the decorative paper 4, or the like, so that the scratch resistance decreases. Herein, the average particle diameter is an average particle diameter by microscopic observation. The average particle diameter by microscopic observation can be obtained by, for example, microscopically observing the foaming agent, measuring the particle diameter of 100 particles of the microscopically observed foaming agent by image processing software or the like, and then number-averaging the measurement results. As the particle diameter of the foaming agent, it is possible to adopt an average value of the major axis diameter and the minor axis diameter of the particle of the foaming agent.

As the foaming agent, it is preferable that the average particle diameter after foaming be 15 $\mu$m or more and 250 $\mu$m or less. When the average particle diameter is less than 15 $\mu$m, there is a possibility that the gloss matte feeling and the touch feeling may become poor. On the other hand, when the average particle diameter is greater than 250 $\mu$m, there is a possibility that the foamed resin layers 9 after foaming may drop off the decorative paper 4, or the like, so that the scratch resistance decreases. The average particle diameter after foaming is more preferably 30 $\mu$m or more and 200 $\mu$m or less. Herein, the average particle diameter of the foaming agent after foaming is an average particle diameter by microscopic observation like the average particle diameter of the foaming agent before foaming. As the particle diameter of the foaming agent after foaming used for the acquisition of the average particle diameter, it is possible to adopt an average value of the major axis diameter and the minor axis diameter of a void formed by the foaming of the foaming agent.

The foaming start temperature of the foaming agent is preferably 100° C. or more and 220° C. or less. When the foaming start temperature is less than 100° C., the foaming start timing is early, and therefore the time during which the foamed resin layers 9 after foaming are heated and pressed is prolonged so that the foamed resin layers 9 after foaming are crushed, leading to a possibility that the gloss matte feeling and the touch feeling may become poor. On the other hand, when the foaming start temperature is higher than 220° C., the foamed resin layers 9 are not sufficiently foamed by the heat pressure molding performed by abutting a metal plate (mirror plate) in the manufacture of the resin-impregnated decorative plate 1, so that there is a possibility that the gloss matte feeling and the touch feeling may become poor. The foaming start temperature is more preferably 120° C. or more and 200° C. or less.

The kind of the uneven pattern 10 formed by the foamed resin layer 9 after foaming is not particularly limited and may be one aligned or not aligned in terms of design with the picture formed by the picture pattern layer 7. In particular, when considering to obtain the resin-impregnated decorative plate 1 excellent in design property, one aligned in terms of design with the picture formed by the picture pattern layer 7 is the most suitable. When the picture formed by the picture pattern layer 7 and the uneven pattern 10 are aligned with each other in terms of design, the arrangement position of the foamed resin layer 9 is aligned with the picture formed by the picture pattern layer 7. Specifically, the foamed resin layer 9 is arranged on a portion where a matte texture is to be expressed in the picture formed by the picture pattern layer 7. For example, the foamed resin layer 9 is arranged on the surface of the picture pattern layer 7 to cover a dark color portion where the brightness is relatively lower than that in other portions of the picture in the picture formed by the picture pattern layer 7. The ratio of the area covered with the foamed resin layer 9 to the area of the dark color portion is preferably 70% or more. In particular, 90% or more is the most suitable. When the picture of the picture pattern layer 7 is set to a wood grain pattern, the foamed resin layers 9 are arranged in a vessel pattern aligned in terms of design with the wood grain pattern of the picture pattern layer 7. The color of the foamed resin layer 9 is not particularly limited. The foamed resin layer 9 may be colorless or colored.

When the foamed resin layer 9 is arranged in the picture pattern layer 7, the foamed resin layer 9 is arranged in the picture pattern layer 7 in such a way as to be mixed into a dark color portion where the brightness is relatively lower than that in other portions of the picture in the picture formed by the picture pattern layer 7. The ratio of the volume of the foamed resin layer 9 to the total value of the volume of the dark color portion and the volume of the foamed resin layer 9 is preferably 70% or more. In particular, 90% or more is the most suitable.

A method for arranging the foamed resin layers 9 is not particularly limited. It is possible to employ, for example, a method for printing a printing ink, obtained by dispersing the foamed resin layers 9 in a diluent solvent along with an appropriate binder resin, on the picture pattern layer 7. As the binder resin, it is possible to use, for example, a curable resin such as a thermosetting resin having a urethane bond, such as a two-component curable urethane resin, or an ionizing radiation curable resin, or one mainly composed of casein and an emulsion resin. As the thermosetting resin, it is possible to adopt, for example, a melamine-based resin, an epoxy-based resin, a urea-based resin, a phenol-based resin, an unsaturated polyester-based resin, a diallyl phthalate-based resin, a benzoguanamine-based resin, a urethane-based resin, an aminoalkyd-based resin, a silicone-based resin, or the like. As the ionizing radiation curable resin, it is possible to adopt, for example, a (meth)acrylate-based resin, an unsaturated polyester-based resin, or the like.

A method for printing the printing ink of the foamed resin layers 9 is not particularly limited like the picture pattern layer 7. It is possible to use an arbitrary printing method such as, for example, a gravure printing method, an offset printing method, a screen printing method, a flexographic printing method, a relief printing method, or an ink jet printing method.

The foamed resin layers 9 contain a colored ink. As a vehicle of the colored ink, one obtained by using one kind of or a mixture of two or more kinds of chlorinated polyolefin such as chlorinated polyethylene or chlorinated polypropylene, polyester, polyurethane composed of isocyanate and polyol, polyacrylic, polyvinyl acetate, polyvinyl chloride, a vinyl chloride-vinyl acetate copolymer, a cellulose-based resin, a polyamide-based resin, and the like, and adding thereto a pigment, a solvent, various adjuvants, and the like to form an ink, can be used.

(Method for Manufacturing Resin-Impregnated Decorative Plate)

Next, a method for manufacturing the resin-impregnated decorative plate 1 according to the embodiment of the present invention will be described.

First, the picture pattern layer 7 is provided on the surface 6a of the base paper 6, the filling layers 8 are provided on the surface 7a of the picture pattern layer 7, and the foamed resin layers 9 are provided on the surfaces 8a of the filling layers 8, thereby forming the decorative paper 4. Then, the decorative paper 4 is immersed in a water-based impregnation liquid in which the impregnating resin 5 is dissolved or dispersed in water, to impregnate the decorative paper 4 with the impregnating resin 5.

As the impregnating resin 5, it is possible to use a thermosetting resin used in the manufacture of a known resin-impregnated decorative plate. For example, a melamine-based resin, an epoxy-based resin, a diallyl phthalate-based resin, a benzoguanamine-based resin, a urethane-based resin, an alkyd-based resin, an unsaturated polyester-based resin, a phenol-based resin, a urea-based resin, or the like can be adopted. The impregnation of the impregnating resin 5 may be performed from the surface side of the decorative paper 4 on which the picture pattern layer 7 is formed, or may be performed from the opposite surface side. Further, the impregnation may be performed for each surface, i.e., twice separately, or the impregnation may be simultaneously performed for both surfaces. The impregnation ratio of the impregnating resin 5 (the ratio of the mass of the impregnating resin to the mass of the decorative paper 4 after impregnation) is preferably 20% or more and 80% or less. In particular, 40% or more and 70% or less is the most suitable. In order to obtain the resin-impregnated decorative plate 1 excellent in physical properties, it is important to uniformly impregnate the entire base paper 6 with the impregnating resin 5.

Then, the decorative paper 4 impregnated with the impregnating resin 5 is dried to obtain the resin-impregnated decorative paper 2. Then, the resin-impregnated decorative paper 2 is placed on the base member 3 (FIG. 2), a metal plate (mirror plate) is caused to abut on the surface, where the foamed resin layers 9 are formed, of the resin-impregnated decorative paper 2, and then heat pressure molding is applied to a multi-layer composite of the resin-impregnated decorative paper 2 and the base member 3 to integrate the resin-impregnated decorative paper 2 and the base member 3 with each other, thereby obtaining the resin-impregnated decorative plate 1. At that time, the foaming agent is foamed by the heat in the heat pressure molding, so that the positions where the foamed resin layers 9 are arranged are bulged to form the uneven patterns 10 (FIG. 1). Then, a gloss matte feeling and a touch feeling are exhibited on the resin-impregnated decorative plate 1 by the formed uneven patterns 10. Herein, the description has been given of the case where the foaming is performed after the impregnation, but not limited thereto. There are also cases where the impregnation and the foaming are performed simultaneously.

Between the base member 3 and the resin-impregnated decorative paper 2, an adhesive or the like may be interposed or an adhesive or the like may not be interposed. Further, a core paper may be interposed as needed like in a method employed for a known melamine resin decorative plate. As the core paper, it is possible to use, for example, one in which an appropriate base paper, such as a titanium paper, a bleached or unbleached kraft paper, or a glass fiber nonwoven fabric, is impregnated with a thermosetting resin in an uncured state. As the thermosetting resin, an arbitrary thermosetting resin can be used according to the physical properties and the like required for the resin-impregnated decorative plate 1 to be targeted. For example, a melamine-based resin, an epoxy-based resin, a diallyl phthalate-based resin, a benzoguanamine-based resin, a urethane-based resin, an alkyd-based resin, an unsaturated polyester-based resin, a phenol-based resin, a urea-based resin, or the like can be adopted. As an example of the core paper, a phenolic resin-impregnated kraft paper that is conventionally widely employed as a core paper for a melamine resin decorative plate can be given.

As a heat pressure molding method for bonding the resin-impregnated decorative paper 2 in a state of being deposited on the base member 3, it is possible to use, for example, a method of abutting a metal plate and then performing platen pressing, a cylinder press type continuous lamination method, or the like. In particular, a continuous lamination method using a metal endless belt is preferable. According to the continuous lamination method, the resin-impregnated decorative plate 1 of high quality that is densely cured and integrated with no warping, waving, or the like of the surface and with good interlayer adhesion can be continuously manufactured at high speed.

When the continuous lamination method is used, the surface shape of the resin-impregnated decorative plate 1 is given by the surface shape, as it is, of the metal plate or the metal endless belt used in the continuous lamination method, or of an embossed sheet produced by a curable resin or the like. Therefore, the resin-impregnated decorative plate 1 excellent in surface glossiness or smoothness can be obtained by using one the surface of which is smoothly polished, such as a mirror surface, as the metal plate, the metal endless belt, or the embossed sheet produced by the curable resin or the like.

Naturally, using a metal plate, a metal endless belt, or an embossed sheet produced by a curable resin or the like in a desired arbitrary matte state or texture state as needed, it is also possible to obtain the resin-impregnated decorative plate 1 in an arbitrary surface finished state according to a use of the resin-impregnated decorative plate 1 to be targeted.

The resin-impregnated decorative plate 1 of the present invention is not limited to the embodiment described above in detail and can be implemented by adding various modifications in a range not departing from the gist of the present invention.

As described above, the resin-impregnated decorative paper 2 according to the embodiment of the present invention is formed by impregnating the decorative paper 4 with the impregnating resin 5, and the decorative paper 4 includes the base paper 6, the picture pattern layer 7, the filling layers 8, and the foamed resin layers 9. The picture pattern layer 7 is provided on the surface 6a side of the base paper 6. The filling layers 8 contain at least one of an epoxy-based resin, an acrylic-based resin, a urethane-based resin, and a casein-based resin and are provided on the surface 7a of the picture pattern layer 7. The foamed resin layers 9 are provided on the surfaces 8a of the filling layers 8. Consequently, it is possible to foam the foaming agent by the heat pressure molding to properly form the uneven patterns on the surface of the resin-impregnated decorative paper. Since it is not necessary to prepare a metal plate for each uneven pattern 10, it is possible to provide the resin-impregnated decorative paper 2 and the resin-impregnated decorative plate 1 that are excellent in gloss matte expression and touch feeling while suppressing the cost. Further, it is possible to restrain the foamed resin forming the foamed resin layers 9 from soaking into the picture pattern layer 7 or the base paper 6. Therefore, it is possible to provide the resin-impregnated decorative paper 2 and the resin-impregnated decorative plate 1 that are further excellent in gloss matte expression and touch feeling.

Further, the thickness of the filling layer 8 is set to 0.5 µm or more and 15 µm or less. Consequently, it is possible to suppress deterioration in design property and thus to provide the resin-impregnated decorative paper 2 and the resin-impregnated decorative plate 1 that are excellent in gloss matte expression and touch feeling.

Further, the thickness of the filling layer 8 is set to 1 µm or more and 10 µm or less. Consequently, it is possible to suppress deterioration in design property and thus to provide the resin-impregnated decorative paper 2 and the resin-impregnated decorative plate 1 that are excellent in gloss matte expression and touch feeling.

Further, the filling layer 8 is provided in the range of 100% or more of the surface area of the foamed resin layer 9. Consequently, it is possible to provide the resin-impregnated decorative paper 2 and the resin-impregnated decorative plate 1 that are excellent in gloss matte expression and touch feeling.

Further, the filling layer 8 is provided in the range of 150% or less of the surface area of the foamed resin layer 9. Consequently, it is possible to provide the resin-impregnated decorative paper 2 and the resin-impregnated decorative plate 1 that effectively suppress deterioration in design property.

Further, the foamed resin layers 9 contain the colored ink. Consequently, it is possible to provide the resin-impregnated decorative paper 2 and the resin-impregnated decorative plate 1 that suppress bleaching of the foamed resin layers 9 to improve the design property.

Further, the decorative paper 4 according to the embodiment of the present invention can form the resin-impregnated decorative plate 1 in which the picture formed by the picture pattern layer 7 and the uneven pattern 10 on the surface of the resin-impregnated decorative plate 1 are aligned with each other in terms of design because the picture formed by the picture pattern layer 7 and the arrangement position of the foamed resin layer 9 are aligned with each other.

Further, the resin-impregnated decorative plate 1 according to the embodiment of the present invention includes the resin-impregnated decorative paper 2 and the base member 3 integrated with the resin-impregnated decorative paper 2. Therefore, it is possible to provide the resin-impregnated decorative plate 1 that is excellent in gloss matte expression and touch feeling while suppressing the cost.

Example 1

Hereinafter, Examples and Comparative Example of the resin-impregnated decorative plate 1 according to the present invention will be described. The present invention is not limited to Examples described below.

Example 1

First, a titanium paper for decorative paper with high water absorbency was prepared as the base paper 6. Then, a wood grain pattern was printed on the surface 6a of the base paper 6 with a water-based ink containing casein as a main component to form the picture pattern layer 7 having a layer thickness of 10 µm. As a printing method, a gravure printing method was used. Then, a vessel pattern aligned in terms of design with the wood grain pattern of the picture pattern layer 7 was printed in line on the surface 7a of the picture pattern layer 7 with a water-based ink containing epoxy as a main component and containing a foaming agent to provide the filling layers 8 in the vessel pattern. A gravure printing method was used as a printing method, and an epoxy-based resin was used as the filling layers 8. The thickness of the filling layer 8 was set to 3 µm, and the range to provide the filling layer 8 was set to 100% of the surface area of the foamed resin layer 9, i.e., the area of a picture formed by the picture pattern layer 7. While there was the plurality of the foamed resin layers 9, the filling layers 8 were each provided in the range of 100% of the surface area of the corresponding one of all the foamed resin layers 9.

Then, the foamed resin layers 9 were printed on the surfaces 8a of the filling layers 8 to form the decorative paper 4. As a printing method, a direct gravure printing method was used. As the foamed resin layer 9, one in which the average particle diameter before foaming was 100 µm (10 times the layer thickness of the picture pattern layer 7), the average particle diameter after foaming was 120 µm, and the foaming start temperature was 180° C. was used. Then, the decorative paper 4 was impregnated with the impregnating resin 5 and then dried in an oven to form the resin-impregnated decorative paper 2. As the impregnating resin 5, a water-based melamine-based resin liquid was used. Then, the resin-impregnated decorative paper 2 was placed on the base member 3. As the base member 3, a particle board base member was used. Then, hot pressing at about 160° C. was applied to the surface, where the foamed resin layers 9 were formed, of the resin-impregnated decorative paper 2 to apply heat pressure molding to a multi-layer composite of the resin-impregnated decorative paper 2 and the base member 3, thereby integrating the resin-impregnated decorative paper 2 and the base member 3 with each other to form the resin-impregnated decorative plate 1 of Example 1. A flat plate was used as a plate in the hot pressing. In the resin-impregnated decorative plate 1, a region with no foamed resin layer 9 of the picture pattern layer 7 was gloss finished, and a region with the foamed resin layer 9 of the picture pattern layer 7 was matte finished.

Example 2

In Example 2, a casein-based resin was used as the filling layers 8. Other than that, the resin-impregnated decorative plate 1 was produced using the same materials and procedure as those of Example 1.

Example 3

In Example 3, an acrylic-based resin was used as the filling layers 8. Other than that, the resin-impregnated decorative plate 1 was produced using the same materials and procedure as those of Example 1.

Example 4

In Example 4, a urethane-based resin was used as the filling layers 8. Other than that, the resin-impregnated decorative plate 1 was produced using the same materials and procedure as those of Example 1.

Example 5

In Example 5, the thickness of the filling layer 8 was set to 0.5 µm. Other than that, the resin-impregnated decorative plate 1 was produced using the same materials and procedure as those of Example 1.

Example 6

In Example 6, the thickness of the filling layer 8 was set to 1 µm. Other than that, the resin-impregnated decorative plate 1 was produced using the same materials and procedure as those of Example 1.

Example 7

In Example 7, the thickness of the filling layer 8 was set to 5 µm. Other than that, the resin-impregnated decorative plate 1 was produced using the same materials and procedure as those of Example 1.

Example 8

In Example 8, the thickness of the filling layer 8 was set to 7 µm. Other than that, the resin-impregnated decorative plate 1 was produced using the same materials and procedure as those of Example 1.

Example 9

In Example 9, the thickness of the filling layer 8 was set to 10 µm. Other than that, the resin-impregnated decorative plate 1 was produced using the same materials and procedure as those of Example 1.

Example 10

In Example 10, the thickness of the filling layer 8 was set to 15 µm. Other than that, the resin-impregnated decorative plate 1 was produced using the same materials and procedure as those of Example 1.

Example 11

In Example 11, the range of the filling layer 8 was increased by 10% and thus was set to 110% of the surface area of the foamed resin layer 9, i.e., the area of a picture formed by the picture pattern layer 7. Other than that, the resin-impregnated decorative plate 1 was produced using the same materials and procedure as those of Example 1.

Example 12

In Example 12, the range of the filling layer 8 was increased by 30% and thus was set to 130% of the surface area of the foamed resin layer 9, i.e., the area of a picture formed by the picture pattern layer 7. Other than that, the resin-impregnated decorative plate 1 was produced using the same materials and procedure as those of Example 1.

Example 13

In Example 13, the range of the filling layer 8 was increased by 50% and thus was set to 150% of the surface area of the foamed resin layer 9, i.e., the area of a picture formed by the picture pattern layer 7. Other than that, the resin-impregnated decorative plate 1 was produced using the same materials and procedure as those of Example 1.

Example 14

In Example 14, a colored ink was added into the foamed resin layers 9. Other than that, the resin-impregnated decorative plate 1 was produced using the same materials and procedure as those of Example 1.

Comparative Example 1

In Comparative Example 1, the filling layers 8 were omitted. Other than that, the resin-impregnated decorative plate 1 was produced using the same materials and procedure as those of Example 1.
(Performance Evaluation)
Performance evaluation described below was performed for the resin-impregnated decorative plates 1 of Examples 1 to 14 and Comparative Example 1.
(Cross-Cut Test)
In a cross-cut test, a cross cut was made in the resin-impregnated decorative plate 1 with a cutter, and an evaluation was made whether or not peeling occurred. A case where there was no significant peeling at the time of cross cutting was evaluated as "○", and a case where there was significant peeling at the time of cross cutting was evaluated as "x".
(Contamination Test)
In a contamination test, the resin-impregnated decorative plate 1 was coated with black crayon and red ink and then wiped off with alcohol after an hour, and the wipe-off residue degree was evaluated. A case where the wipe-off residue degree was less than 30% was evaluated as "○", a case where the wipe-off residue degree was 30% or more and less than 70% was evaluated as "Δ", and a case where the wipe-off residue degree was 70% or more was evaluated as "x".
(Touch Feeling Evaluation)
In touch feeling evaluation, evaluations were made by 10 assessors as a sensory test. A case where the number of assessors who gave a good evaluation was 7 to 10 was evaluated as "○", a case where the number of assessors who gave a good evaluation was 1 to 6 was evaluated as "Δ", and a case where the number of assessors who gave a good evaluation was zero was evaluated as "x".
(Design Evaluation)
In design evaluation, evaluations were made by 10 assessors as a sensory test. A case where the number of assessors who gave a good evaluation was 7 to 10 was evaluated as "○", a case where the number of assessors who gave a good evaluation was 1 to 6 was evaluated as "Δ", and a case where the number of assessors who gave a good evaluation was zero was evaluated as "x".
(Long-Term Environmental Test)
In a long-term environmental test, the resin-impregnated decorative plate 1 was left in an environment of a temperature of 40° C. and a humidity of 90% for 2 months, and then, evaluations were made by 10 assessors as a sensory test for design change. A case where the number of assessors who gave a good evaluation was 7 to 10 was evaluated as "○", a case where the number of assessors who gave a good evaluation was 1 to 6 was evaluated as "Δ", and a case where the number of assessors who gave a good evaluation was zero was evaluated as "x".
(Comprehensive Judgment)
A comprehensive evaluation was made based on the five items, i.e., the cross-cut test, the contamination test, the touch feeling evaluation, the design evaluation, and the long-term environmental test described above. An evaluation that was particularly excellent was given as "⊚", an evaluation that was excellent was given as "○", an evaluation with almost no problem was given as "Δ", and an evaluation with a problem was given as "x".
(Evaluation Results)
These evaluation results are illustrated in Table 1.

TABLE 1

| | Cross-Cut Test | Contamination Test | Touch Feeling Evaluation | Design Evaluation | Long-Term Environmental Test | Comprehensive Judgment |
|---|---|---|---|---|---|---|
| Example 1 (epoxy) | ○ | ○ | ○ | ○ | ○ | ⊚ |
| Example 2 (casein) | ○ | ○ | Δ | ○ | ○ | ○ |
| Example 3 (acrylic) | ○ | Δ | ○ | Δ | ○ | Δ |
| Example 4 (urethane) | ○ | Δ | Δ | Δ | Δ | Δ |
| Example 5 (0.5 μm) | ○ | ○ | Δ | ○ | ○ | ○ |
| Example 6 (1 μm) | ○ | ○ | ○ | ○ | ○ | ⊚ |
| Example 7 (5 μm) | ○ | ○ | ○ | ○ | ○ | ⊚ |
| Example 8 (7 μm) | ○ | ○ | ○ | Δ | ○ | ○ |
| Example 9 (10 μm) | ○ | Δ | ○ | Δ | ○ | Δ |
| Example 10 (15 μm) | ○ | Δ | Δ | Δ | ○ | Δ |
| Example 11 (110%) | ○ | ○ | ○ | Δ | ○ | ○ |
| Example 12 (130%) | ○ | Δ | ○ | Δ | Δ | Δ |
| Example 13 (150%) | ○ | Δ | ○ | Δ | Δ | Δ |
| Example 14 (ink) | ○ | ○ | ○ | ○ | ○ | ⊚ |
| Comparative Example 1 | ○ | X | X | X | X | X |

As illustrated in Table 1, with respect to the cross-cut test, peeling was not observed in any of Examples 1 to 14 and Comparative Example 1, and therefore there was no problem in adhesion. However, compared to Comparative Example 1 in which the filling layers 8 were omitted, the touch feeling evaluation and the design evaluation were improved in Examples 1 to 14 in which the filling layers 8 were provided. In particular, as revealed by the evaluation results of Examples 1 to 4, the resin-impregnated decorative plates 1 respectively employing the epoxy-based resin, the acrylic-based resin, the urethane-based resin, and the casein-based resin as the filling layers 8 were excellent or had almost no problem with respect to the touch feeling evaluation and the design evaluation. Further, as revealed by the evaluation results of Examples 5 to 10, there was a tendency for a decrease in design property as the thickness of the filling layer 8 increased. Further, as revealed by the evaluation results of Examples 11 to 13, there was a tendency for a decrease in design property as the coating area of the filling layer 8 increased. On the other hand, when the filling layer 8 is too thin (less than 0.5 µm), the foamed resin soaks, so that a touch feeling and a gloss matte feeling decrease and further the design property also decreases. Further, as revealed by the evaluation results of Example 14, the degree of freedom for design expression was improved and the design property was improved by adding the colored ink into the foamed resin layers 9. As the comprehensive judgment, the resin-impregnated decorative plates 1 of Examples 1, 6, 7, and 14 were particularly excellent. Although the epoxy-based resin was used as the filling layers 8 in Examples 5 to 14, even when the casein-based resin, the acrylic-based resin, the urethane-based resin, or the like is used instead of the epoxy-based resin, there is no large difference in basic physical properties so that approximately the same results are obtained.

While the description has been given above with reference to a limited number of embodiments, the scope of the right is not limited thereto, and alterations of the embodiments based on the disclosure described above are apparent to those skilled in the art.

REFERENCE SIGNS LIST

1 resin-impregnated decorative plate
2 resin-impregnated decorative paper
3 base member
3*a* surface
4 decorative paper
5 impregnating resin
6 base paper
6*a* surface
7 picture pattern layer
7*a* surface
8 filling layer
8*a* surface
9 foamed resin layer
10 uneven pattern

The invention claimed is:

1. A resin-impregnated decorative paper formed by impregnating a decorative paper with an impregnating resin, the decorative paper comprising:
   a base paper;
   a picture pattern layer provided on a surface side of the base paper;
   a filling layer provided on a surface of the picture pattern layer; and
   a foamed resin layer provided on a surface of the filling layer, the foamed resin layer formed by a foaming agent,
   wherein the filling layer contains at least one of an epoxy-based resin, an acrylic-based resin, a urethane-based resin, and a casein-based resin, and
   wherein the filling layer has a thickness of 0.5 µm or more and 7 µm or less.

2. The resin-impregnated decorative paper according to claim 1, wherein the filling layer is provided in a range of 100% or more of a surface area of the foamed resin layer.

3. The resin-impregnated decorative paper according to claim 2, wherein the filling layer is provided in a range of 150% or less of the surface area of the foamed resin layer.

4. The resin-impregnated decorative paper according to claim 1, wherein the foamed resin layer contains a colored ink.

5. The resin-impregnated decorative paper according to claim 1, wherein a picture formed by the picture pattern layer and an arrangement position of the foamed resin layer are aligned with each other.

6. A resin-impregnated decorative plate comprising:
   the resin-impregnated decorative paper according to claim 1; and
   a base member integrated with the resin-impregnated decorative paper.

7. The resin-impregnated decorative paper according to claim 2, wherein the foamed resin layer contains a colored ink.

8. The resin-impregnated decorative paper according to claim 3, wherein the foamed resin layer contains a colored ink.

9. The resin-impregnated decorative paper according to claim 2, wherein a picture formed by the picture pattern layer and an arrangement position of the foamed resin layer are aligned with each other.

10. The resin-impregnated decorative paper according to claim 3, wherein a picture formed by the picture pattern layer and an arrangement position of the foamed resin layer are aligned with each other.

11. The resin-impregnated decorative paper according to claim 4, wherein a picture formed by the picture pattern layer and an arrangement position of the foamed resin layer are aligned with each other.

12. A resin-impregnated decorative plate comprising:
   the resin-impregnated decorative paper according to claim 2; and
   a base member integrated with the resin-impregnated decorative paper.

\* \* \* \* \*